United States Patent
Medvedev et al.

(10) Patent No.: US 7,466,749 B2
(45) Date of Patent: Dec. 16, 2008

(54) RATE SELECTION WITH MARGIN SHARING

(75) Inventors: Irina Medvedev, Somerville, MA (US); Jay Rodney Walton, Carlisle, MA (US)

(73) Assignee: QUALCOMM Incorporated, San Diego, CA (US)

(*) Notice: Subject to any disclaimer, the term of this patent is extended or adjusted under 35 U.S.C. 154(b) by 308 days.

(21) Appl. No.: 11/128,698

(22) Filed: May 12, 2005

(65) Prior Publication Data

US 2006/0256848 A1    Nov. 16, 2006

(51) Int. Cl.
H04B 3/46 (2006.01)
H04B 17/00 (2006.01)
H04B 7/02 (2006.01)

(52) U.S. Cl. .............. 375/227; 375/260; 375/267; 375/295; 375/346

(58) Field of Classification Search ........... 375/227, 375/346, 221; 370/338, 465, 335, 342, 468, 370/252
See application file for complete search history.

(56) References Cited

U.S. PATENT DOCUMENTS

| | | | | | |
|---|---|---|---|---|---|
| 5,479,447 | A * | 12/1995 | Chow et al. | ............. | 375/260 |
| 5,790,550 | A * | 8/1998 | Peeters et al. | ............. | 370/480 |
| 5,822,374 | A * | 10/1998 | Levin | ............. | 375/260 |
| 6,072,779 | A * | 6/2000 | Tzannes et al. | ............. | 370/252 |
| 6,122,247 | A * | 9/2000 | Levin et al. | ............. | 370/210 |
| 6,205,410 | B1 * | 3/2001 | Cai | ............. | 702/191 |
| 6,222,888 | B1 * | 4/2001 | Kao et al. | ............. | 375/260 |
| 6,510,184 | B1 * | 1/2003 | Okamura | ............. | 375/260 |
| 6,636,568 | B2 * | 10/2003 | Kadous | ............. | 375/225 |
| 6,744,811 | B1 * | 6/2004 | Kantschuk | ............. | 375/222 |
| 6,798,738 | B1 * | 9/2004 | Do et al. | ............. | 370/210 |
| 6,959,171 | B2 * | 10/2005 | Tsien et al. | ............. | 455/67.11 |
| 6,980,601 | B2 * | 12/2005 | Jones | ............. | 375/261 |
| 6,985,534 | B1 * | 1/2006 | Meister | ............. | 375/260 |
| 7,003,044 | B2 * | 2/2006 | Subramanian et al. | ............. | 375/260 |
| 7,137,047 | B2 * | 11/2006 | Mitlin et al. | ............. | 714/704 |
| 7,274,734 | B2 * | 9/2007 | Tsatsanis | ............. | 375/222 |
| 7,333,556 | B2 * | 2/2008 | Maltsev et al. | ............. | 375/295 |
| 2002/0044610 | A1 * | 4/2002 | Jones | ............. | 375/261 |
| 2003/0185311 | A1 * | 10/2003 | Kim | ............. | 375/260 |
| 2004/0151108 | A1 * | 8/2004 | Claret et al. | ............. | 370/206 |
| 2004/0151122 | A1 * | 8/2004 | Lau et al. | ............. | 370/252 |

(Continued)

*Primary Examiner*—Mohammad H Ghayour
*Assistant Examiner*—Sophia Vlahos
(74) *Attorney, Agent, or Firm*—Ross L. Franks; Kenneth K. Vu; Thomas R. Rouse

(57) ABSTRACT

Rate selection with margin sharing in a system with independent data stream rates is presented. Signal-to-Noise Ratio (SNR) estimates are obtained for each stream. Rates are selected for the streams based on the SNR estimates, such that at least one data stream has an SNR margin below a threshold, each remaining data stream has an SNR margin above a respective threshold, and the total SNR margin for all streams is above a total threshold. For rate selection with margin sharing with a vector-quantized rate set, SNR estimates are obtained for usable transmission channels. The total SNR margin is determined for each rate combination based on the estimates. Each rate combination is associated with a specific number of data streams to transmit, a specific rate for each data stream, and a specific overall throughput. The combination with the highest overall throughput and non-negative total SNR margin is selected.

22 Claims, 9 Drawing Sheets

U.S. PATENT DOCUMENTS

| | | |
|---|---|---|
| 2005/0152465 A1* | 7/2005 | Maltsev et al. ............... 375/260 |
| 2005/0276343 A1* | 12/2005 | Jones ......................... 375/260 |
| 2006/0018395 A1* | 1/2006 | Tzannes ..................... 375/260 |
| 2006/0067417 A1* | 3/2006 | Park et al. .................... 375/260 |
| 2006/0159120 A1* | 7/2006 | Kim ........................... 370/465 |
| 2006/0209894 A1* | 9/2006 | Tzannes et al. ............. 370/468 |

* cited by examiner

RATE SELECTION WITH MARGIN SHARING

BACKGROUND

I. Field

The present invention relates generally to communication, and more specifically to techniques for selecting rates for data transmission in a communication system.

II. Background

In a communication system, a transmitter may transmit multiple streams of data via multiple transmission channels to a receiver. The transmission channels may be formed in the spatial domain, frequency domain, time domain, or a combination thereof. For example, the multiple transmission channels may correspond to different spatial channels in a multiple-input multiple-output (MIMO) communication system, different frequency subbands in an orthogonal frequency division multiplex (OFDM) communication system, or different time slots in a time division multiplex (TDM) communication system.

The transmission channels may experience different channel conditions (e.g., different fading, multipath, and interference effects) and may achieve different signal-to-noise ratios (SNRs). The SNR of a transmission channel determines its transmission capability, which is typically quantified by a particular data rate that may be reliably transmitted on the transmission channel. If the SNR varies from transmission channel to transmission channel, then the supported data rate would also vary from channel to channel. Furthermore, if the channel conditions vary with time, then the data rates supported by the transmission channels would also vary with time.

A major challenge in a coded communication system is selecting the appropriate rates to use for the multiple data streams based on the channel conditions. As used herein, a "rate" may indicate a particular data rate or information bit rate, a particular coding scheme, a particular modulation scheme, and so on to use for a data stream. The rate selection should maximize the overall throughput for the multiple transmission channels while meeting certain quality objectives, which may be quantified by a target packet error rate (PER).

There is therefore a need in the art for techniques to select suitable rates for data transmission on multiple transmission channels.

SUMMARY

Techniques for performing rate selection with margin sharing are described herein. According to an embodiment of the invention, a method is provided in which SNR estimates are initially determined for multiple data streams. Rates are then selected for the data streams based on the SNR estimates and such that at least one data stream has negative SNR margin, each remaining data stream has a non-negative SNR margin, and the total SNR margin for all data streams is non-negative.

According to another embodiment, an apparatus is described which includes a channel estimator and a controller. The channel estimator determines SNR estimates for multiple data streams. The controller selects rates for the data streams based on the SNR estimates and such that at least one data stream has negative SNR margin, each remaining data stream has a non-negative SNR margin, and the total SNR margin for all data streams is non-negative.

According to yet another embodiment, an apparatus is described which includes means for determining SNR estimates for multiple data streams and means for selecting rates for the data streams based on the SNR estimates and such that at least one data stream has negative SNR margin, each remaining data stream has a non-negative SNR margin, and the total SNR margin for all data streams is non-negative.

According to yet another embodiment, processor readable media is provided for storing instructions operable in an apparatus to obtain SNR estimates for multiple data streams and to select rates for the data streams based on the SNR estimates and such that at least one data stream has negative SNR margin, each remaining data stream has a non-negative SNR margins, and the total SNR margin for all data streams is non-negative.

According to yet another embodiment, a method is provided in which an SNR estimate is initially determined for each of multiple transmission channels usable for data transmission. The total SNR margin is then determined for each of multiple rate combinations based on the SNR estimates for the transmission channels. Each rate combination is associated with a specific number of data streams to transmit, a specific rate for each data stream, and a specific overall throughput. A rate combination is selected from among the multiple rate combinations based on the total SNR margins and the overall throughputs for these rate combinations.

According to yet another embodiment, an apparatus is described which includes a channel estimator and a controller. The channel estimator determines an SNR estimate for each of multiple transmission channels usable for data transmission. The controller determines the total SNR margin for each of multiple rate combinations based on the SNR estimates for the transmission channels and selects a rate combination from among the multiple rate combinations based on the total SNR margins and the overall throughputs for these rate combinations.

According to yet another embodiment, an apparatus is described which includes means for determining an SNR estimate for each of multiple transmission channels usable for data transmission, means for determining the total SNR margin for each of multiple rate combinations based on the SNR estimates for the transmission channels, and means for selecting a rate combination from among the multiple rate combinations based on the total SNR margins and the overall throughputs for these rate combinations.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The rate selection with margin sharing techniques described herein may be used for various communication systems with multiple transmission channels. For example, these techniques may be used for a MIMO system, an OFDM-based system, a TDM system, a MIMO system that utilizes OFDM (i.e., a MIMO-OFDM system), and so on. A MIMO system employs multiple (T) transmit antennas at a transmitter and multiple (R) receive antennas at a receiver for data transmission. A MIMO channel formed by the T transmit antennas and R receive antennas may be decomposed into S spatial channels, where $S \leq \min\{T, R\}$. S transmission channels may be formed with the S spatial channels. An OFDM system effectively partitions the overall system bandwidth into multiple (K) orthogonal subbands, which are also called tones, subcarriers, bins, and frequency channels. Each subband is associated with a respective carrier that may be modulated with data. K transmission channels may be formed with the K subbands. A MIMO-OFDM system has S spatial channels for each of the K subbands. Up to S·K transmission channels may be formed with the spatial channels of the subbands in the MIMO-OFDM system. A TDM system may transmit data in frames, where each frame may have multiple (Q) time slots. Q transmission channels may be formed for the Q time slots in each frame.

In general, multiple transmission channels may be formed in various manners. For clarity, much of the following description is for a MIMO-OFDM system, and each transmission channel may correspond to a wideband spatial channel (described below). Each transmission channel may be used to send one data stream.

Figure 1:
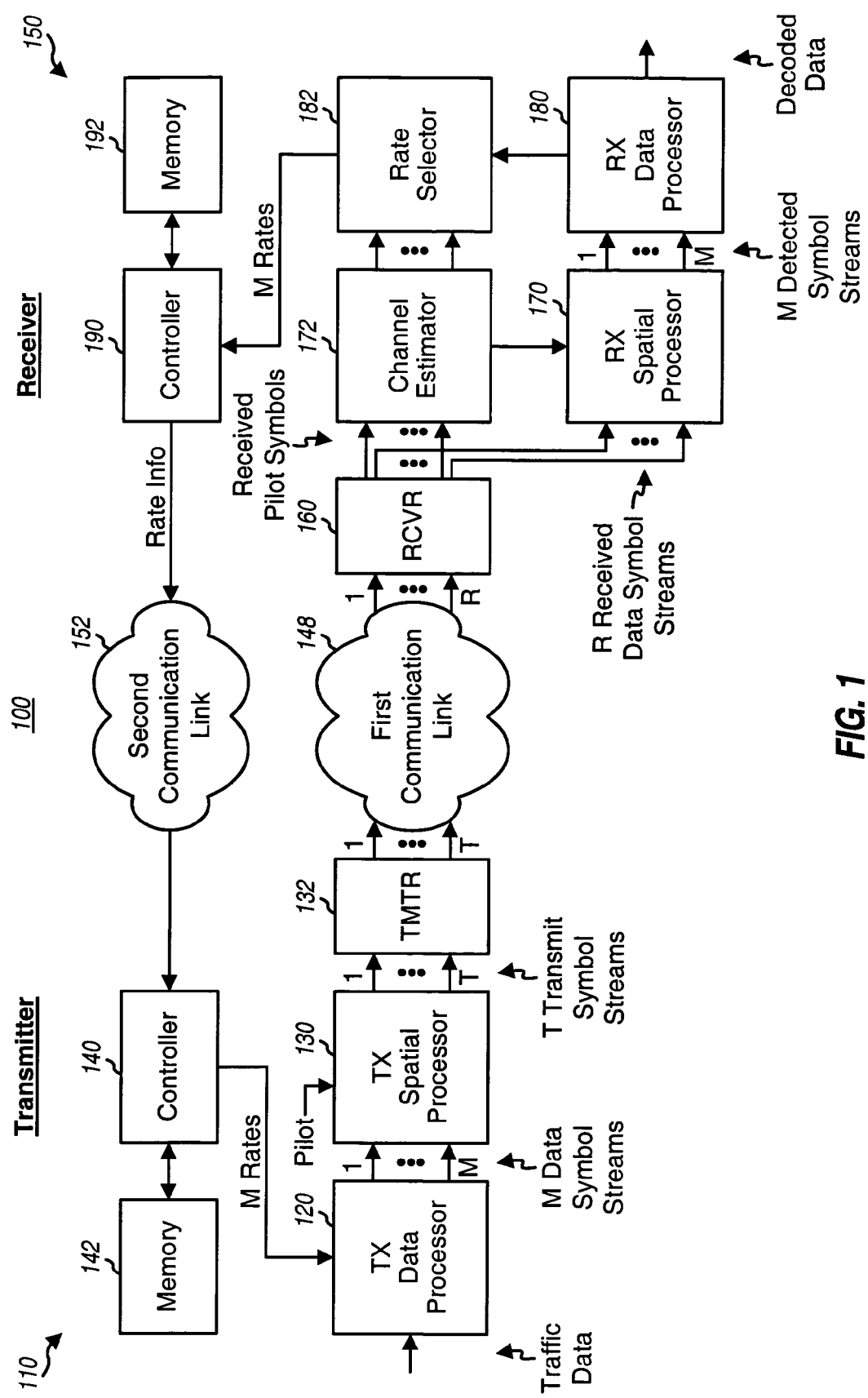
FIG. 1 shows a transmitter and a receiver in a communication system.

FIG. 1 shows a diagram of a transmitter 110 and a receiver 150 in a multi-channel communication system 100. At transmitter 110, a TX data processor 120 receives traffic data, processes (e.g., encodes, interleaves, and symbol maps) the traffic data in accordance with M rates from a controller 140, and generates M data symbol streams, where $M \geq 1$. As used herein, a data symbol is a modulation symbol for traffic/packet data, a pilot symbol is a modulation symbol for pilot (which is data that is known a priori by both the transmitter and receiver), a modulation symbol is a complex value for a point in a signal constellation for a modulation scheme (e.g., M-PSK or M-QAM), and a symbol is any complex value. A TX spatial processor 130 receives and multiplexes the M data symbol streams with pilot symbols, performs spatial processing on the data and pilot symbols (if applicable), and provides T transmit symbol streams.

A transmitter unit (TMTR) 132 processes the T transmit symbol streams and generates T modulated signals, which are transmitted from T antennas and via a first communication link 148. Communication link 148 distorts the modulated signals with a channel response and further degrades the modulated signals with additive white Gaussian noise (AWGN) and possibly interference from other transmitters.

At receiver 150, R antennas receive the transmitted signals and provide R received signals to a receiver unit (RCVR) 160. Receiver unit 160 conditions and digitizes the R received signals and further processes the samples in a manner complementary to the processing performed by transmitter unit 132. Receiver unit 160 provides received pilot symbols to a channel estimator 172 and R streams of received data symbols to a receive (RX) spatial processor 170. Channel estimator 172 derives a channel estimate for communication link 148 and provides the channel estimate to RX spatial processor 170. RX spatial processor 170 performs receiver spatial processing (or spatial matched filtering) on the R received data symbol streams with the channel estimate and provides M detected symbol streams, which are estimates of the M data symbol streams sent by transmitter 110. An RX data processor 180 processes (e.g., symbol demaps, deinterleaves, and decodes) the M detected symbol streams in accordance with the M rates selected for these streams and provides decoded data, which is an estimate of the traffic data sent by transmitter 110. RX data processor 180 may further provide decoding results (e.g., the status of each received packet and/or decoder metrics) to a rate selector 182.

For rate control, channel estimator 172 may process the received pilot symbols (and possibly the detected data symbols) and determine SNR estimates for the M streams. Rate selector 182 receives the SNR estimates and the decoding results, selects a suitable rate for each stream, and provides M selected rates for the M streams to a controller 190. Controller 190 sends rate information (e.g., the M selected rates) and possibly other information (e.g., acknowledgments for received packets) via a second communication link 152 to transmitter 110. Controller 140 at transmitter 110 receives the rate information and provides the M rates to TX data processor 120. FIG. 1 shows the rate selection being performed by receiver 150. In general, the rate selection may be performed by receiver 150, transmitter 110, or both the receiver and transmitter.

For the MIMO-OFDM system, the MIMO channel between the transmitter and the receiver may be characterized by a set of K channel response matrices, $H(k)$ for $k=1, \ldots, K$. Each channel response matrix $H(k)$ has a dimension of R×T and contains a complex gain between each transmit antenna and each receive antenna for subband k. Each matrix $H(k)$ includes S spatial channels, where $S \leq \min\{T, R\}$. S orthogonal spatial channels (or eigenmodes) may be obtained for each subband k by decomposing $H(k)$, as described below. In any case, up to S wideband spatial channels may be formed for the MIMO channel, where each wideband spatial channel includes one spatial channel for each of the K subbands. For example, each wideband spatial channel may correspond to the K subbands of one transmit antenna. As another example, each wideband spatial channel may include one eigenmode for each of the K subbands. Each wideband spatial channel may be used as a transmission channel.

The frequency response of each transmission channel m may be given by $h_m(k)$ for $k=1, \ldots, K$, where $h_m(k)$ is the complex channel gain for subband k of transmission channel m. For simplicity, it is assumed that $h_m(k)$ is constant across subband k. The received SNR for each subband of each transmission channel may be expressed as:

$$\gamma_m(k) = 10\log_{10}\left(P_m(k) \cdot \frac{|h_m(k)^2|}{N_0}\right), \quad \text{Eq (1)}$$

for $$k = 1, \ldots, K$$

and $$m = 1, \ldots, S,$$

where $P_m(k)$ is the transmit power used for subband k of transmission channel m;

$N_0$ is the noise variance at the receiver; and $\gamma_m(k)$ is the received SNR for subband k of transmission channel m.

Equation (1) shows a simple expression for received SNR. In general, a received SNR expression may include terms for various factors. For example, in a MIMO system, the received SNR is dependent on the spatial processing performed by the transmitter and the receiver, as described below. For simplicity, the noise variance $N_0$ is assumed to be constant across the K subbands. The received SNR in equation (1) is given in units of decibel (dB). All of the SNR computation described below is also in units of dB unless noted otherwise.

Figure 2:
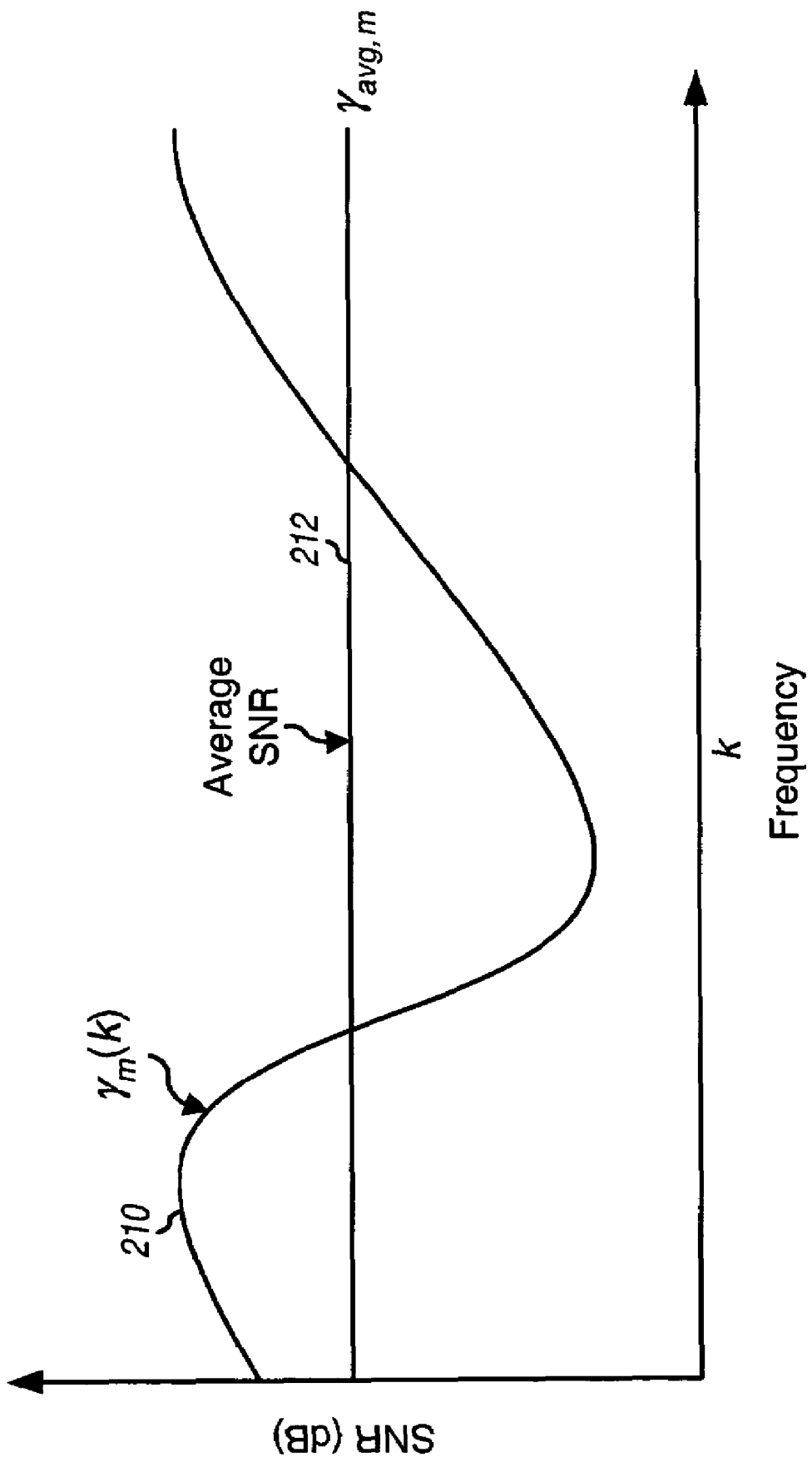
FIG. 2 shows a plot of received SNR versus frequency for a transmission channel.

FIG. 2 shows an exemplary plot 210 of the received SNR for a transmission channel with frequency selective fading. For a multipath channel, the channel gains $h_m(k)$ vary across the K subbands, and different received SNRs are achieved for different subbands, as shown by plot 210. An average SNR may be determined for the received SNRs of all subbands, as shown by line 212.

The transmitter may transmit one data stream on each of M transmission channels, where $S \geq M \geq 1$. The number of data streams to transmit may be selected based on various factors such as the channel conditions, the achievable overall throughput, and so on. The rates for the M data streams may be selected in various manners. In general, the rate control with margin sharing techniques may be used for (1) a system with independent rate per stream, whereby the rate for each stream can be independently selected, and (2) a system with a vector-quantized rate set, whereby only certain combinations of rates are allowed.

Figure 3:
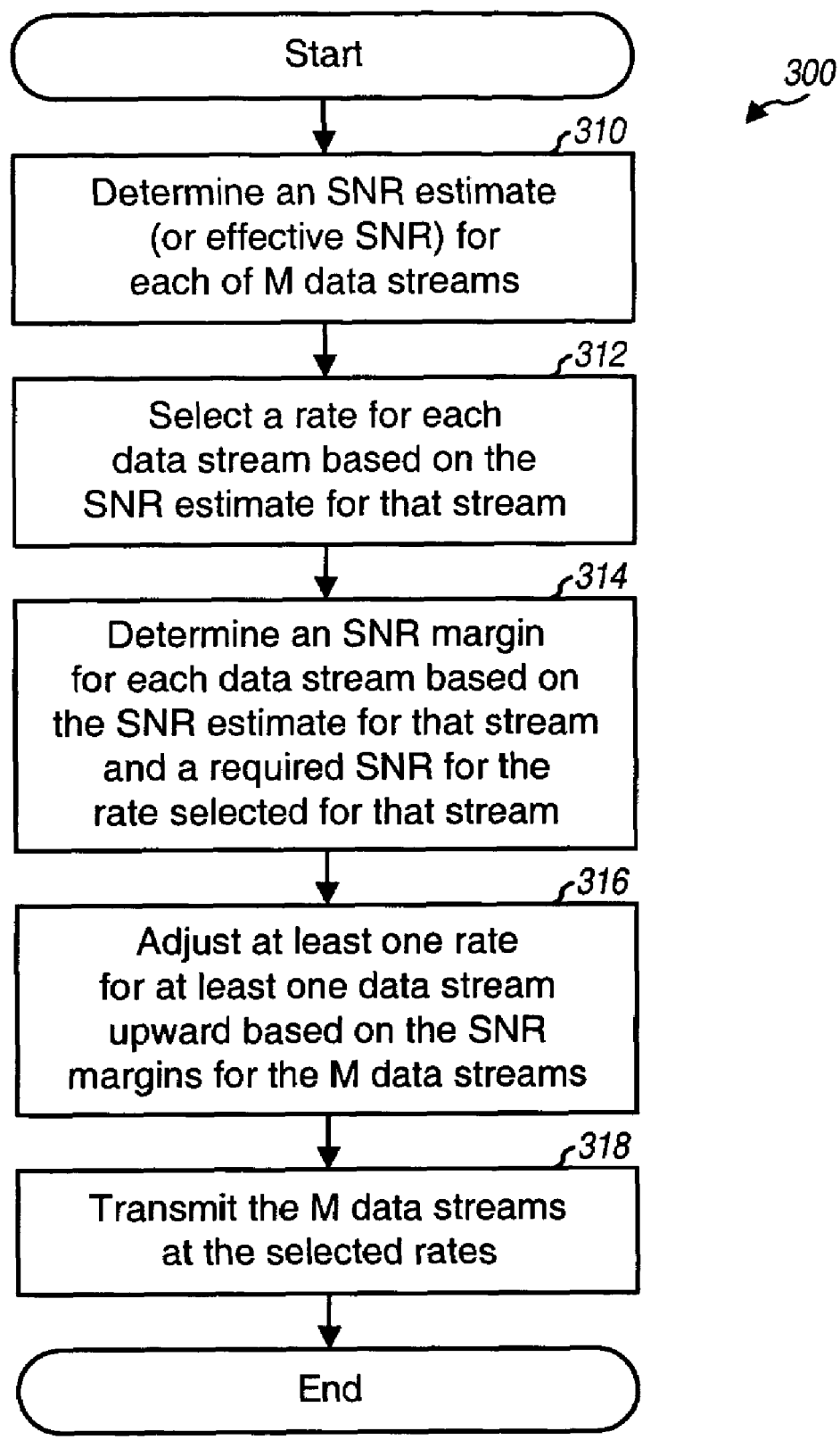
FIG. 3 shows a rate selection process for independent rate per stream.

FIG. 3 shows a process 300 for selecting the rates for M data streams for a system with independent rate per stream. Initially, an SNR estimate (which is also called an effective SNR) is obtained for each of the M data streams (block 310). A rate is then selected for each data stream based on the SNR estimate for that stream (block 312). An SNR margin is determined for each data stream based on the SNR estimate for that stream and a required SNR for the rate selected for that stream (block 314). At least one rate for at least one data stream is adjusted upward based on the SNR margins for the M data streams, if possible, such that at least one stream has negative SNR margin, the remaining streams have non-negative SNR margins, and the total SNR margin for all M streams is non-negative (block 316). The M data streams are then transmitted at the rates selected for these steams, where each rate may or may not have been adjusted upward via margin sharing (block 318). The blocks in FIG. 3 are described in further detail below.

The rate for each data stream may be selected based on the received SNRs for the transmission channel used to send that data stream. An embodiment for selecting the rate for each data stream (for blocks 310 and 312) is described below. For this embodiment, the received SNRs for all of the subbands of each transmission channel are first determined, e.g., based on the received pilot symbols.

The average SNR for each data stream/transmission channel may be computed as:

$$\gamma_{avg,m} = \frac{1}{K} \cdot \sum_{k=1}^{K} \gamma_m(k), \quad \text{Eq (2)}$$

for $m = 1, \ldots, M$, where $\gamma_{avg,m}$ is the average SNR for data stream m, in units of dB.

The variance of the received SNRs for each data stream may be computed as:

$$\sigma_{snr,m}^2 = \frac{1}{(K-1)} \cdot \sum_{k=1}^{K} (\gamma_m(k) - \gamma_{avg,m})^2, \quad \text{Eq (3)}$$

for $m = 1, \ldots, M$, where $\sigma_{snr,m}^2$ is the SNR variance for data stream m.

The effective SNR for each data stream may be computed as:

$$SNR_{eff}(m) = \gamma_{avg,m} - \gamma_{bo,m}, \text{ for } m=1, \ldots, M, \quad \text{Eq (4)}$$

where $\gamma_{bo,m}$ is a back-off factor for data stream m; and $SNR_{eff}(m)$ is the effective SNR (or SNR estimate) for data stream m.

The back-off factor $\gamma_{bo,m}$ is used to account for various factors such as variability in the received SNRs across a transmission channel. The back-off factor may be a function of the average SNR and the SNR variance, or $\gamma_{bo,m} = F(\gamma_{avg,m}, \sigma_{snr,m}^2)$. For example, the back-off factor may be defined as: $\gamma_{os,m} = K_{bo} \cdot \sigma_{snr,m}^2$, where $K_{bo}$ is a constant. The back-off factor may also be defined based on system specific factors such as the diversity, coding schemes, interleaving schemes, packet sizes, and so on used for the data streams.

The system may support a specific set of rates. Each supported rate is associated with a particular minimum SNR required to achieve the desired level of performance (e.g., 1% PER for a non-fading, AWGN channel). A look-up table may store the supported rates and the required SNR for each supported rate. The effective SNR for each data stream may be compared against the required SNRs for the supported rates. The supported rate with the highest data rate and a required SNR that is less than or equal to the effective SNR is then selected for the data stream.

Table 1 lists an exemplary set of 14 rates supported by the system, which are given rate indices 0 through 13. Each rate is associated with a specific spectral efficiency, a specific code rate, a specific modulation scheme, and a specific required SNR. The spectral efficiency refers to the data rate (or information bit rate) normalized by the system bandwidth, and is given in units of bits per second per Hertz (bps/Hz). The code rate and the modulation scheme for each rate in Table 1 are for a specific system design. The null rate with index 0 has a zero data rate (or no data transmission). For each non-null rate with a non-zero data rate, the required SNR is obtained based on the specific system design (i.e., the code rate, interleaving scheme, modulation scheme, and so on used by the system for that rate) and for an AWGN channel. The required SNR may be obtained by computation, computer simulation, empirical measurements, and so on, as is known in the art. For each non-null rate, the SNR gap is the difference between the required SNR for that rate and the required SNR for the next higher rate. Since the rate with index 13 is the highest supported rate, its SNR gap is set to infinity or some other large value.

TABLE 1

| Rate Index | Spectral Efficiency (bps/Hz) | Code Rate | Modulation Scheme | Required SNR (dB) | SNR Gap (dB) |
|---|---|---|---|---|---|
| 0 | 0.0 | — | — | — | — |
| 1 | 0.25 | 1/4 | BPSK | −1.8 | 3.0 |
| 2 | 0.5 | 1/2 | BPSK | 1.2 | 3.0 |
| 3 | 1.0 | 1/2 | QPSK | 4.2 | 2.6 |
| 4 | 1.5 | 3/4 | QPSK | 6.8 | 3.3 |
| 5 | 2.0 | 1/2 | 16 QAM | 10.1 | 1.6 |
| 6 | 2.5 | 5/8 | 16 QAM | 11.7 | 1.5 |
| 7 | 3.0 | 3/4 | 16 QAM | 13.2 | 3.0 |
| 8 | 3.5 | 7/12 | 64 QAM | 16.2 | 1.2 |
| 9 | 4.0 | 2/3 | 64 QAM | 17.4 | 1.4 |
| 10 | 4.5 | 3/4 | 64 QAM | 18.8 | 1.2 |
| 11 | 5.0 | 5/6 | 64 QAM | 20.0 | 4.2 |
| 12 | 6.0 | 3/4 | 256 QAM | 24.2 | 2.1 |
| 13 | 7.0 | 7/8 | 256 QAM | 26.3 | ∞ |

M rates may be initially selected for the M data streams as described above and denoted as $R_m$ for $m=1, \ldots, M$. In the following description, rate $R_m$ and rate index $R_m$ are used interchangeably. The required SNR for the rate initially selected for each data stream is less than or equal to the effective SNR for that stream. Each data stream thus has a non-negative SNR margin, which may be expressed as:

$$SNR_{margin}(m) = SNR_{eff}(m) - SNR_{req}(R_m), \text{ for } m=1, \ldots, M, \quad \text{Eq (5)}$$

where $R_m$ is the rate initially selected for data stream m;
$SNR_{req}(R_m)$ is the required SNR for rate $R_m$; and
$SNR_{margin}(m)$ is the SNR margin for data stream m.

The total SNR margin for all M data streams may be expressed as:

$$SNR_{\text{total\_margin}} = \sum_{m=1}^{M} SNR_{margin}(m). \quad \text{Eq (6)}$$

The amount of SNR margin that may be passed from any one stream to other stream(s) may be limited to a predetermined maximum value, e.g., $SNR_{margin}(m) \leq SNR_{margin}^{max} = 2$ dB. This may be achieved by limiting $SNR_{margin}(m)$ for each stream m in equation (6) to be within $SNR_{margin}^{max}$. $SNR_{margin}^{max}$ may be fixed for all streams or may be a function of rate, code rate, modulation scheme, stream index, and so on, which may be different for each stream. Limiting $SNR_{margin}(m)$ can reduce the variation in the SNR margins for the M streams. The total SNR margin may also be limited to another predetermined maximum value, e.g., $SNR_{total\_margin} \leq SNR_{total\_margin}^{max} = 6$ dB. The amount of SNR that may be reallocated to any one stream is then limited to $SNR_{total\_margin}^{max}$. This ensures that no stream will be sent at a rate with a required SNR that is excessively above the effective SNR for that stream. In general, the amount of SNR that may be reallocated to any one stream may be limited to $SNR_{re-allo}^{max}$, which is a suitably selected value that may be equal to or lower than $SNR_{total\_margin}^{max}$. $SNR_{re-allo}^{max}$ may be a fixed value or a function of rate, code rate, modulation scheme, stream index, and so on.

The transmitter may encode the traffic data using a single base code to generate code bits, then parse the code bits into M streams, and further process (e.g., puncture and symbol map) the code bits for each stream in accordance with the rate selected for that stream, as described below. The receiver may perform the complementary processing, reassemble the detected symbols for the M streams, and decode the reassembled detected symbols. A sequence/packet of detected symbols to be decoded at the receiver may consist of groups of detected symbols that are generated with different rates. The outcome of each decoded bit is typically affected by the received SNRs for adjacent and nearby detected symbols. If the detected symbols for the M streams are decoded together, then the SNR margins for these streams may be shared among the streams in order to achieve a higher overall throughput. The margin sharing reallocates the total SNR margin with the goal of achieving a higher rate on at least one stream. Several embodiments of margin sharing are described below.

Figure 4:
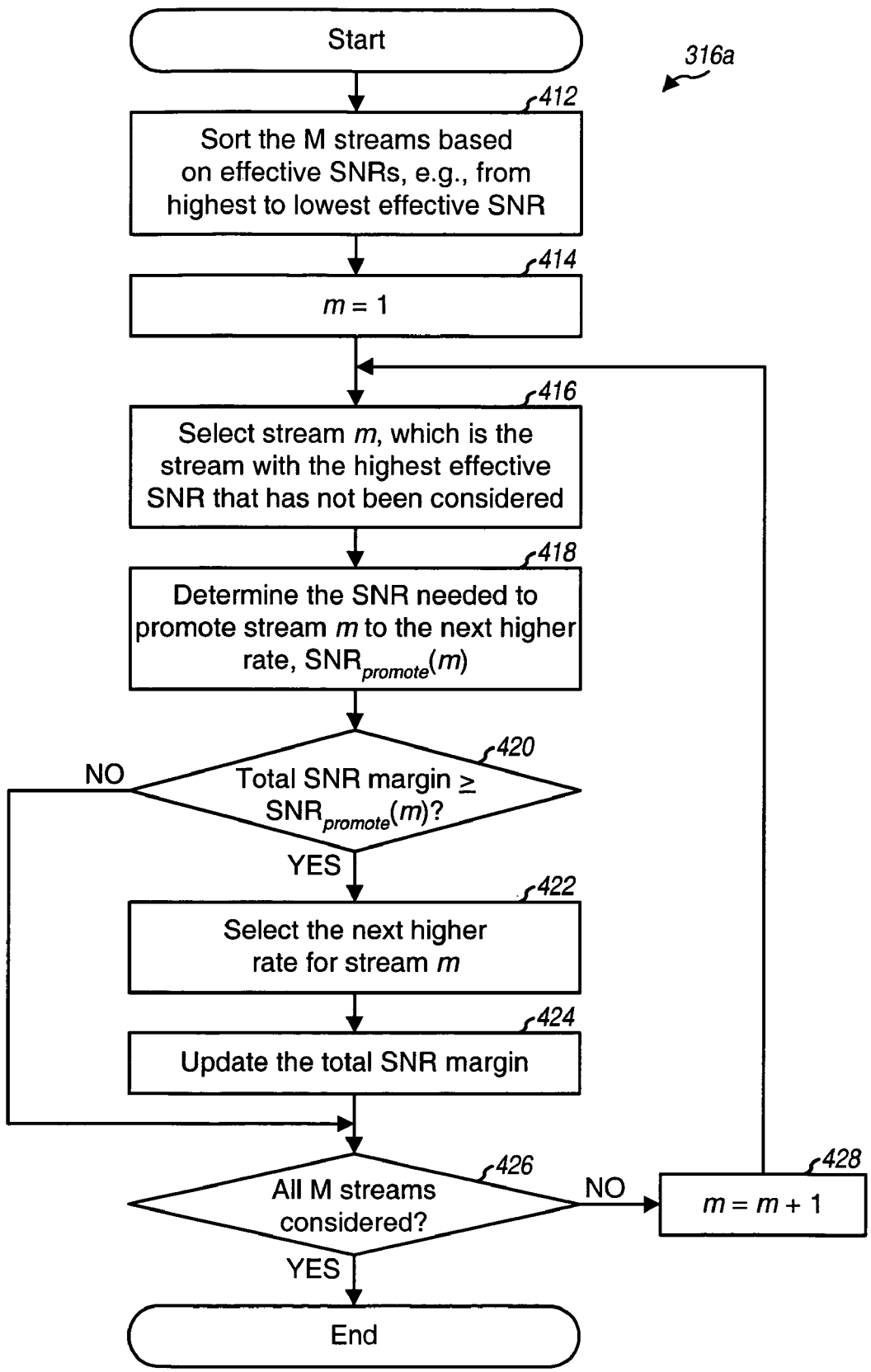
FIG. 4 shows a process for performing stream-ordered margin sharing.

FIG. 4 shows a process 316a for performing stream-ordered margin sharing, which is a first embodiment of margin sharing for a system with independent rate per stream. Process 316a may be used for block 316 in FIG. 3. For this embodiment, the total SNR margin is reallocated to the M streams in a sequential order based on their effective SNRs. Initially, the M streams are sorted based on their effective SNRs, with the first stream having the highest effective SNR and the last stream having the lowest effective SNR (block 412). Stream index m is initialized to 1 (block 414).

Stream m, which is the stream with the highest effective SNR that has not been considered, is selected (block 416). The SNR needed to promote stream m to the next higher rate is determined (block 418), as follows:

$$SNR_{promote}(m) = \begin{cases} SNR_{gap}(R_m) & \text{if } R_{max} \geq R_m > R_{min}, \\ SNR_{req}(R_m + 1) - SNR_{eff}(m) & \text{if } R_m = R_{min}, \end{cases} \quad \text{Eq (7)}$$

where $R_{min}$ is the lowest supported rate, which is rate index 0 in Table 1;
$R_{max}$ is the highest supported rate, which is rate index 13 in Table 1; and
$SNR_{promote}(m)$ is the SNR needed to promote stream m to the next higher rate assuming that the SNR margin on stream m has been removed.

If the effective SNR for stream m is less than −1.8 dB, then the null rate $R_{min}$ is initially selected for stream m. The SNR to promote stream m to the lowest non-null rate with index 1 is equal to the difference between the required SNR for rate index 1 and the effective SNR for stream m. If the highest supported rate $R_{max}$ is initially selected for stream m, then setting $SNR_{promote}(m)$ to infinity or a large value ensures that the total SNR margin will not be sufficient to promote stream m.

A determination is then made whether the total SNR margin is greater than or equal to the SNR needed to promote stream m to the next higher rate (block 420). If the answer is 'Yes', then the next higher rate is selected for stream m (block 422), and the total SNR margin is updated (block 424), as follows:

$$SNR_{total\_margin} = SNR_{total\_margin} - SNR_{promote}(m). \quad \text{Eq (8)}$$

After block 424, and also if the answer is 'No' for block 420, a determination is made whether all M streams have been considered (block 426). If the answer is 'No', then stream index m is incremented (block 428), and the process returns to block 416 to consider the stream with the next lower effective SNR. Otherwise, if all M streams have been considered, then the process terminates. Although not shown in FIG. 4, the process may also terminate if the total SNR margin is zero or a small value that cannot promote any of the remaining streams.

For the first embodiment of margin sharing shown in FIG. 4, the M streams are ordered from highest to lowest effective SNRs and are then considered one at a time and in a sequential order starting with the stream having the highest effective SNR. For a second embodiment of margin sharing, which is also called reverse stream-ordered margin sharing, the M streams are ordered from lowest to highest effective SNRs and are then considered one at a time and in a sequential order starting with the stream having the lowest effective SNR. The second embodiment may be implemented as shown in FIG. 4, albeit with the M streams sorted in increasing order of effective SNRs (instead of decreasing order of effective SNRs).

Figure 5:
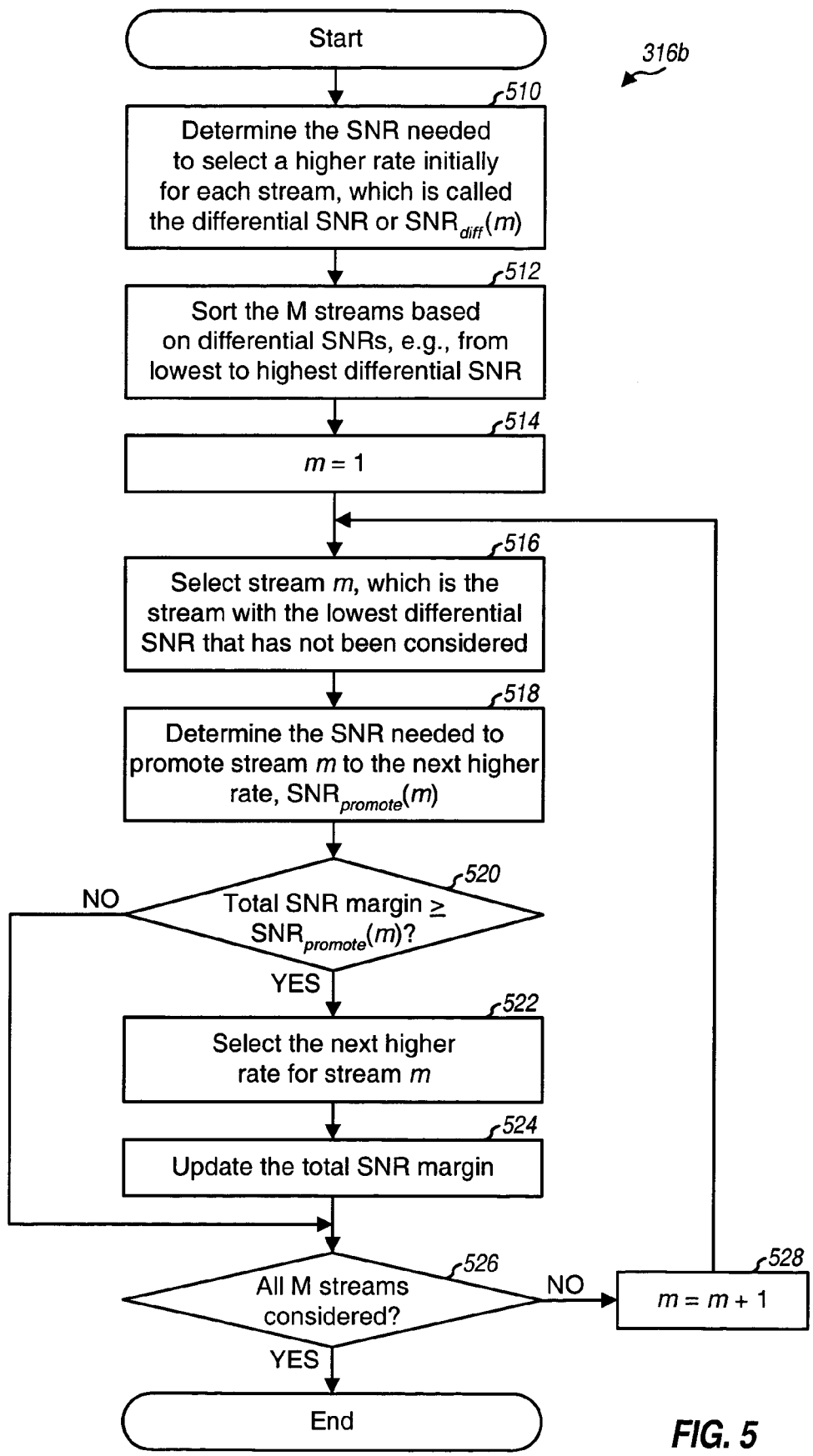
FIG. 5 shows a process for performing rank-ordered margin sharing.

FIG. 5 shows a process 316b for performing rank-ordered margin sharing, which is a third embodiment of margin sharing for a system with independent rate per stream. Process 316b may also be used for block 316 in FIG. 3.

The SNR needed to initially select a higher rate for each stream in block 312 of FIG. 3, which is also called the differential SNR, is determined (block 510), as follows:

$$SNR_{diff}(m) = \begin{cases} \infty & \text{if } R_m = R_{max}, \\ SNR_{req}(R_m + 1) - SNR_{eff}(m) & \text{if } R_{max} > R_m \geq R_{min}, \end{cases} \quad \text{Eq (9)}$$

If the null rate $R_{min}$ is initially selected for stream m, then $SNR_{diff}(m)$ is equal to the SNR needed to promote stream m to the lowest non-null rate. If the highest supported rate $R_{max}$ is initially selected for stream m, then setting $SNR_{diff}(m)$ to infinity or a large value ensures that stream m will be selected last for margin sharing. The amount of SNR that may be reallocated to any one stream may be limited to $SNR_{re\text{-}allo}^{max}$, as described above. In this case, if the differential SNR for any stream is greater than $SNR_{re\text{-}allo}^{max}$, then the differential SNR may be set to infinity so that the stream will not be promoted.

The M streams are then sorted based on their differential SNRs, with the first stream having the lowest differential SNR and the last stream having the highest differential SNR (block 512). The stream index m is initialized to 1 (block 514).

Stream m, which is the stream with the lowest differential SNR that has not been considered, is selected (block 516). The SNR needed to promote stream m to the next higher rate is then determined as shown in equation (7) (block 518). The total SNR margin is computed with the assumption that rate $R_m$ is initially selected for stream m, and the SNR margin for stream m is included in the total SNR margin. Thus, $SNR_{promote}(m)$ and not $SNR_{diff}(m)$ is needed to select the next higher rate $R_m+1$ for stream m. A determination is then made whether the total SNR margin is greater than or equal to the SNR needed to promote stream m to the next higher rate (block 520). If the answer is 'Yes', then the next higher rate is selected for stream m (block 522), and the total SNR margin is updated as shown in equation (8) (block 524).

After block 524, and also if the answer is 'No' for block 520, a determination is made whether all M streams have been considered (block 526). If the answer is 'No', then stream index m is incremented (block 528), and the process returns to block 516 to consider the stream with the next lower differential SNR. Otherwise, if all M streams have been considered, then the process terminates. The process may also terminate if the total SNR margin is zero or a small value (not shown in FIG. 5). Steps 514 through 528 may also be repeated any number of times until all of the available SNR margin is used up, or the streams have been promoted the maximum number of times, or no more streams may be promoted, or some other exit criterion is satisfied. The third embodiment promotes streams in an ordered manner such that (1) the stream that needs the least amount of SNR margin for promotion is promoted first and (2) the stream that needs the most amount of SNR margin is promoted last. This embodiment may improve performance and may allow more streams to be promoted.

In a fourth embodiment of margin sharing for a system with independent rate per stream, the SNR needed to promote each stream to the next higher rate is initially computed as shown in equation (7). The M streams are then ordered based on their promote SNRs, with the first stream having the lowest promote SNR and the last stream having the highest promote SNR. The M streams are then considered one at a time and in a sequential order starting with the stream having the lowest promote SNR. The fourth embodiment attempts to promote streams having smaller promote SNRs first, which may allow more streams to be promoted.

The margin sharing embodiments described above are for a system in which the rate for each stream can be independently selected. This allows the total SNR margin to be allocated to any stream. The rate for each stream is adjusted to the next higher rate index $R_m+1$ if allowed by the total SNR margin.

The rate for a stream may also be promoted more than one rate index higher. In an embodiment, the rate for each stream may be promoted as much as possible based on the total SNR margin. For example, instead of calculating $SNR_{promote}(m)$ for stream m, the highest rate with a required SNR that is smaller than $SNR_{eff}(m)+SNR_{total\_margin}$ may be selected for stream m. In another embodiment, the rate for each stream may be promoted by a maximum of Q rate indices, where in general $Q \geq 1$. The embodiments shown above in FIGS. 4 and 5 are then for the case in which Q=1.

A system may allow only certain combinations of rates, e.g., in order to reduce the amount of rate information to send back to the transmitter. The set of rate combinations allowed by the system is often called a vector-quantized rate set. Table 2 shows an exemplary vector-quantized rate set for a system in which the transmitter can transmit up to four data streams. For this rate set, rate identifiers (IDs) 0 through 13 are for transmission of one data stream and are given in Table 1 as rate indices 0 through 13, respectively, rate IDs 14 through 24 are for transmission of two data streams, rate IDs 25 through 35 are for transmission of three data streams, and rate IDs 36 through 43 are for transmission of four data streams. For each rate ID, the number of streams to transmit (Num Str), the rate to use for each stream, and the overall throughput (OTP)/overall spectral efficiency are given in Table 2. As an example, for rate ID 31, the overall throughput is 12.0 bps/Hz, three streams are transmitted, rate 12 (256 QAM and code rate ¾) is used for stream 1, rate 9 (64 QAM and code rate ⅔) is used for stream 2, and rate 5 (16 QAM and code rate ½) is used for stream 3.

TABLE 2

| Rate ID | OTP bps/Hz | Num Str | Rate for Stream 1 | 2 | 3 | 4 |
|---|---|---|---|---|---|---|
| 14 | 2.0 | 2 | 4 | 2 | — | — |
| 15 | 2.5 | 2 | 4 | 3 | — | — |
| 16 | 3.0 | 2 | 5 | 3 | — | — |

TABLE 2-continued

| Rate ID | OTP bps/Hz | Num Str | Rate for Stream 1 | 2 | 3 | 4 |
|---|---|---|---|---|---|---|
| 17 | 4.0 | 2 | 7 | 3 | — | — |
| 18 | 4.5 | 2 | 7 | 4 | — | — |
| 19 | 4.5 | 2 | 9 | 2 | — | — |
| 20 | 6.0 | 2 | 10 | 4 | — | — |
| 21 | 6.0 | 2 | 9 | 5 | — | — |
| 22 | 8.0 | 2 | 12 | 5 | — | — |
| 23 | 9.0 | 2 | 12 | 7 | — | — |
| 24 | 12.0 | 2 | 12 | 12 | — | — |
| 25 | 6.0 | 3 | 7 | 5 | 3 | — |
| 26 | 6.0 | 3 | 9 | 4 | 2 | — |
| 27 | 8.0 | 3 | 10 | 5 | 4 | — |
| 28 | 9.0 | 3 | 10 | 7 | 4 | — |
| 29 | 9.0 | 3 | 10 | 9 | 2 | — |
| 30 | 12.0 | 3 | 10 | 10 | 7 | — |
| 31 | 12.0 | 3 | 12 | 9 | 5 | — |
| 32 | 12.0 | 3 | 12 | 10 | 4 | — |
| 33 | 13.5 | 3 | 12 | 10 | 7 | — |
| 34 | 13.5 | 3 | 12 | 12 | 4 | — |
| 35 | 16.0 | 3 | 12 | 12 | 9 | — |
| 36 | 8.0 | 4 | 9 | 7 | 2 | 2 |
| 37 | 12.0 | 4 | 10 | 10 | 5 | 3 |
| 38 | 16.0 | 4 | 12 | 10 | 9 | 4 |
| 39 | 16.0 | 4 | 12 | 10 | 10 | 3 |
| 40 | 16.0 | 4 | 12 | 12 | 7 | 3 |
| 41 | 18.0 | 4 | 12 | 12 | 9 | 5 |
| 42 | 18.0 | 4 | 12 | 12 | 10 | 4 |
| 43 | 21.0 | 4 | 12 | 12 | 12 | 7 |

Rate control with margin sharing may be performed in various manners in a system with a vector-quantized rate set. Several embodiments are described below.

Figure 6:
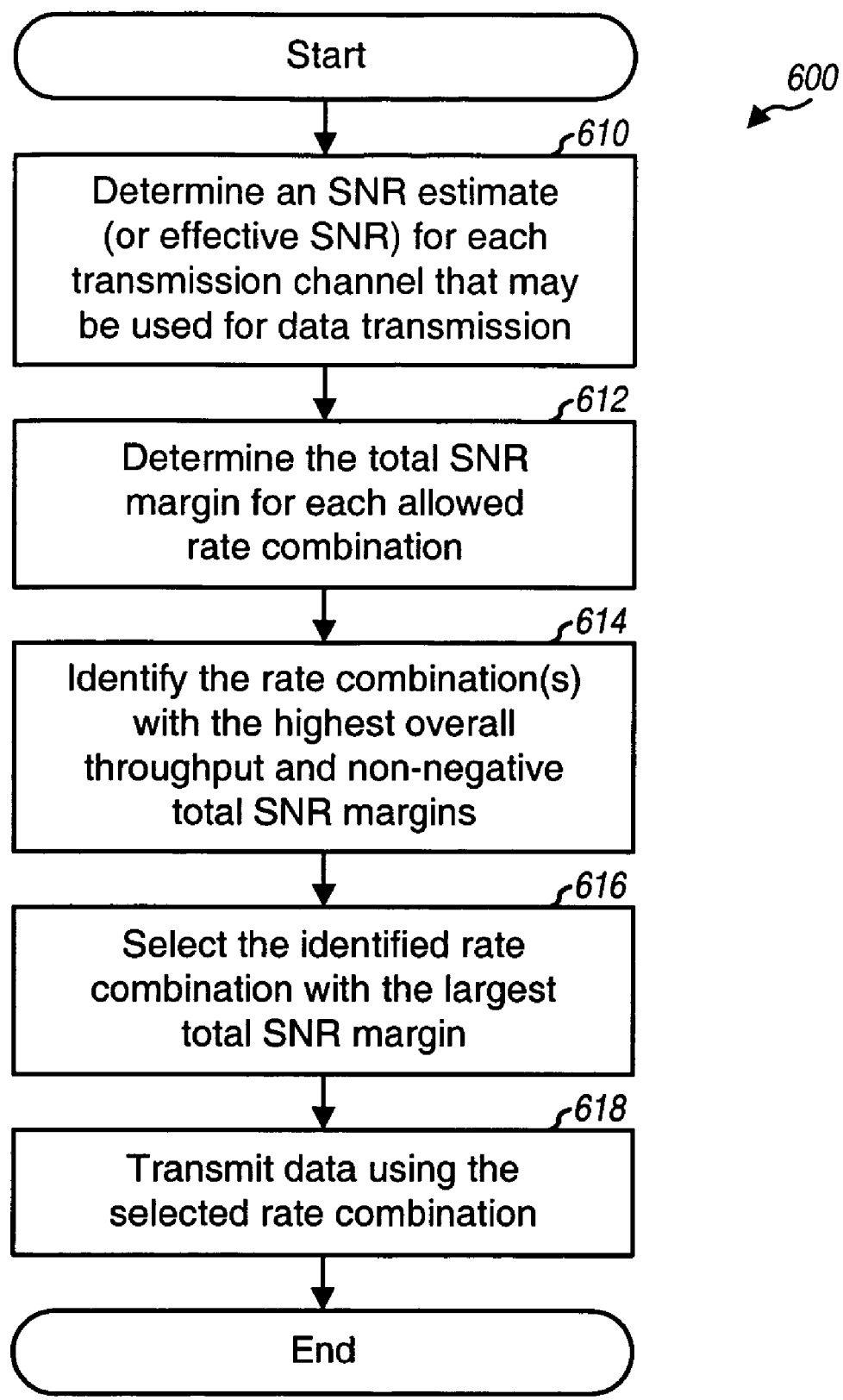
FIG. 6 shows a rate selection process for a vector-quantized rate set.

FIG. 6 shows a process 600 for selecting rates for data streams in a system with a vector-quantized rate set, in accordance with a first embodiment. Initially, the effective SNR for each transmission channel that may be used for data transmission is determined (block 610). The total SNR margin for each allowed rate combination is determined based on the effective SNRs (block 612). The total SNR margin for a given rate combination with L streams (where $S \geq L \geq 1$) may be determined as follows. The SNR margin for each stream m in the rate combination is first computed as shown in equation (5), where $SNR_{eff}(m)$ is the effective SNR for the transmission channel used for stream m and $SNR_{req}(R_m)$ is the required SNR for the rate specified for stream m by the rate combination. Because the rate for each stream in the rate combination is specified, the SNR margin for each stream may be a positive or negative value. The total SNR margin is equal to the sum of the SNR margins for the L streams in the rate combination, as shown in equation (6). If the SNR margin for any stream in the rate combination is below a predetermined minimum value (e.g., −2 dB), then the total SNR margin for the rate combination may be set to minus infinity or some large negative value so that this rate combination will not be selected for use. If the number of streams to transmit is known, then only the rate combinations for that number of streams are evaluated.

The rate combination(s) with the highest overall throughput and non-negative total SNR margins are identified (block 614). Multiple rate combinations may be identified in block 614 if the rate set has more than one rate combination with the same overall throughput. For example, the rate set shown in Table 2 has five rate combinations with an overall throughput of 12.0 bps/Hz. The identified rate combination with the largest total SNR margin is selected for use (block 616). Data is then transmitted using the selected rate combination (block 618).

Figure 7:
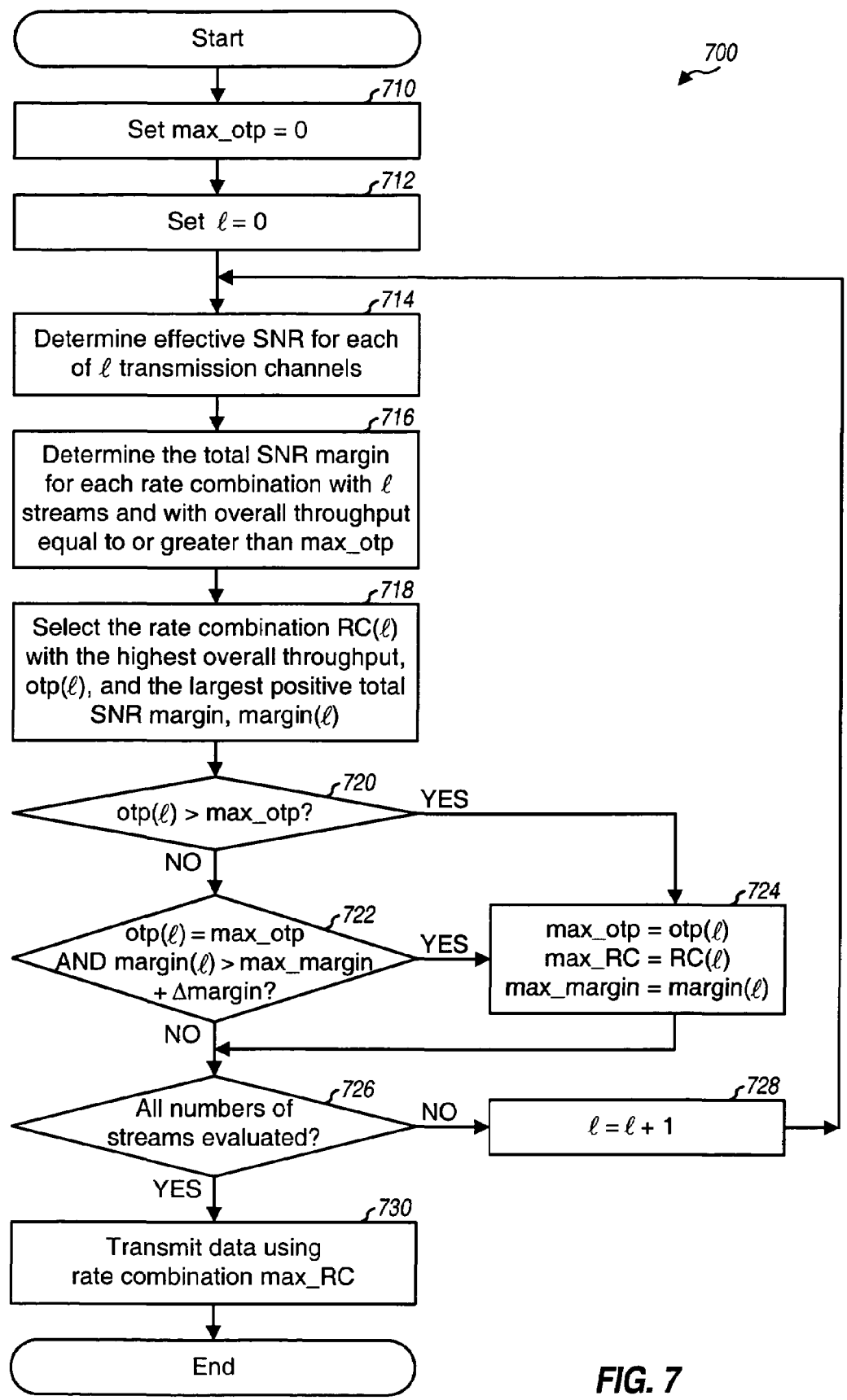
FIG. 7 shows another rate selection process for a vector-quantized rate set.

FIG. 7 shows a process 700 for selecting rates for data streams in a system with a vector-quantized rate set, in accordance with a second embodiment. A variable max_otp denotes the maximum overall throughput achieved for all data streams and is initialized to zero (block 710). An index l denotes the number of streams to transmit and is initialized to one (block 712).

The effective SNR for each of l transmission channels used to transmit l data streams is determined (block 714). As noted above, the effective SNR computation may be dependent on the spatial processing performed by the transmitter and the receiver for the l streams. The total SNR margin for each rate combination with l streams and an overall throughput greater than or equal to max_otp is determined (block 716), e.g., as described above for block 612 in FIG. 6. Margin sharing may or may not be applied for each rate combination that is evaluated in block 716. If margin sharing is applied, then any of the margin sharing embodiments described above for independent rate per stream (e.g., stream-ordered margin sharing, rank-ordered margin sharing, and so on) may be used.

The rate combination with the highest overall throughput and the largest positive total SNR margin is then selected from among all evaluated rate combinations with l streams (block 718), e.g., as described above for blocks 614 and 616 in FIG. 6. The selected rate combination is denoted as RC(l), the overall throughput for this rate combination is denoted as otp(l), and the total SNR margin for this rate combination is denoted as margin(l). A determination is then made whether the highest overall throughput for l streams is greater than the current maximum overall throughput, or whether otp(l) >max_otp (block 720). If the answer is 'Yes', then the maximum overall throughput is set to the highest overall throughput for l streams, the rate combination RC(l) is saved in a variable max_RC, and the total SNR margin for RC(l) is saved in a variable max_margin (block 724). The process then proceeds to block 726.

If the answer is 'No' for block 720, then a determination is made whether (1) the highest overall throughput for l streams is equal to the current maximum overall throughput and (2) the total SNR margin for rate combination RC(l) exceeds the current max-margin by a predetermined amount, which is denoted as Δmargin (block 722). If rate combination RC(l) for l streams and another rate combination RC(j) for fewer than l streams can achieve the same overall throughput, then rate combination RC(l) may be selected if it has a higher total SNR margin by the predetermined amount. Otherwise, rate combination RC(j) with fewer streams may be selected in order to (1) reduce the processing at the transmitter and the receiver and (2) increase protection from crosstalk among the streams. If the answer is 'Yes' for block 722, then the rate combination RC(l), the overall throughput for RC(l), and the total SNR margin for RC(l) are saved as max_RC, max_otp, and max_margin, respectively, in block 724.

If the answer is 'No' for block 722, and also after block 724, a determination is made whether all different numbers of streams have been evaluated (block 726). If the answer is 'No', then index l is incremented (block 728), and the process returns to block 714 to evaluate the next higher number of streams. Otherwise, if all different numbers of streams have been evaluated, then rate combination max_RC is selected for use, and data is transmitted using this selected rate combination (block 730).

Although not shown in FIG. 7 for simplicity, process 700 may be terminated if the highest overall throughput otp(l) for the current number of streams does not exceed the maximum overall throughput. For example, if the answer is 'No' for block 720, then the process may perform blocks 722 and 724 and then terminate.

In a third embodiment for selecting rates in a system with a vector-quantized rate set, a total required SNR is computed for each rate combination as the sum of the required SNRs for the specified rates for all of the streams in that rate combination. The total required SNRs and the overall throughputs for all rate combinations in the rate set may be stored in a look-up table. For rate selection, a total effective SNR is computed as the sum of the effective SNRs for all of the transmission channels that may be used for data transmission. The rate combination with the highest overall throughput and a total required SNR that is less than or equal to the total effective SNR is then selected for use. This embodiment does not limit the amount of SNR margin that may be re-allocated to each stream.

FIGS. 3 through 5 show exemplary embodiments for performing rate selection with margin sharing for a system with independent rate per stream. FIGS. 6 and 7 show exemplary embodiments for performing rate selection with margin sharing for a system with a vector-quantized rate set. The rate selection with margin sharing may also be performed in other manners. The margin sharing allows one or more streams to operate with negative SNR margin so that a higher overall throughput can be achieved for the data transmission.

As noted above, the rate selection with margin sharing techniques may be used for various systems and for various types of transmission channels. In a MIMO system, different transmission channels may be formed with the transmitter performing different spatial processing such as, e.g., eigensteering, no steering, and spatial spreading.

For eigensteering, the channel response matrix H(k) for each subband may be diagonalized via eigenvalue decomposition, as follows:

$$R(k) = H^H(k) \cdot H(k) = E(k) \cdot \Lambda(k) \cdot E^H(k),\qquad \text{Eq (10)}$$

where E(k) is a unitary matrix of eigenvectors, $\Lambda(k)$ is a diagonal matrix, and "$^H$" denotes the conjugate transpose. The transmitter may transmit data on up to S orthogonal spatial channels (or eigenmodes) of each subband k using the steering matrix E(k). The diagonal matrix $\Lambda(k)$ for each subband k contains the power gains for the S eigenmodes of H(k). The channel response matrix H(k) for each subband may also be diagonalized via singular value decomposition as $H(k) = U(k) \cdot \Sigma(k) \cdot E^H(k)$, where U(k) is a unitary matrix of left singular vectors, E(k) is a unitary matrix of right singular vectors (which is also the matrix of eigenvectors), and $\Sigma(k)$ is a diagonal matrix of channel gains for the S eigenmodes of H(k).

For no steering, the transmitter transmits data without any spatial processing, e.g., transmits one data stream from each transmit antenna. For spatial spreading, the transmitter transmits data with different steering matrices V(k) that vary over the frequency band, so that the data transmission observes an ensemble of effective channels.

Table 3 shows the spatial processing performed by the transmitter for eigensteering, no steering, and spatial spreading. In Table 3, subscript "es" denotes eigensteering, "ns" denotes no steering, and "ss" denotes spatial spreading. The processing shown in Table 3 is for a given subband, and thus, the subband index k is omitted for clarity. s is a vector with up to S data symbols to be sent on one subband in one symbol period. $x_x$ is a vector with up to T transmit symbols to be sent from the T transmit antennas on one subband in one symbol period for mode x, where "x" may be "es", "ns" or "ss". $H_x$ is an effective channel response matrix observed by the data vector s for mode x.

TABLE 3

Transmitter Spatial Processing

| | Eigensteering | No Steering | Spatial Spreading |
|---|---|---|---|
| Spatial Processing | $x_{es} = E \cdot s$ | $x_{ns} = s$ | $x_{ss} = V \cdot s$ |
| Effective Channel | $H_{es} = H \cdot E$ | $H_{ns} = H$ | $H_{ss} = H \cdot V$ |

The received symbols obtained by the receiver may be expressed as:

$$r_x = H \cdot x_x + n = H_x \cdot s + n,\qquad \text{Eq (11)}$$

where $r_x$ is a vector of received symbols for mode x and n is a vector of noise, which may be assumed to be AWGN with a variance of $\sigma_n^2$.

Table 4 shows the spatial processing performed by the receiver to obtain detected symbols ŝ, which are estimates of the transmitted data symbols in s. The full channel state information (full-CSI) technique may be used for eigensteering. The channel correlation matrix inversion (CCMI) and minimum mean square error (MMSE) techniques may be used for eigensteering, no steering, and spatial spreading. For each technique, the receiver derives a spatial filter matrix M for each subband based on the actual or effective channel response matrix for that subband. The receiver then performs spatial matched filtering on the received symbols with the spatial filter matrix.

TABLE 4

Receiver Spatial Processing

| | Receiver Matched Filtering | Received SNR |
|---|---|---|
| Full-CSI | $M_{es} = \Lambda^{-1} \cdot E^H \cdot H^H$ <br> $\hat{s}_{es} = M_{es} \cdot r_{es}$ | $\gamma_{es,m}(k) = $ <br> $10 \log_{10}\left(\dfrac{P_m(k) \cdot \lambda_m(k)}{\sigma_n^2}\right)$ |
| CCMI | $M_{ccmi} = [H_x^H \cdot H_x]^{-1} \cdot H_x^H$ <br> $\hat{s}_{ccmi} = M_{ccmi} \cdot r_x$ | $\gamma_{ccmi,m}(k) = $ <br> $10 \log_{10}\left(\dfrac{P_m(k)}{r_m(k) \cdot \sigma_n^2}\right)$ |
| MMSE | $M_{mmse} = [H_x^H \cdot H_x + \sigma_n^2 \cdot I]^{-1} \cdot H_x^H$ <br> $D_{mmse} = [diag\ [M_{mmse} \cdot H_x]]^{-1}$ <br> $\hat{s}_{mmse} = D_{mmse} \cdot M_{mmse} \cdot r_x$ | $\gamma_{mmse,m}(k) = $ <br> $10 \log_{10}\left(\dfrac{q_m(k)}{1 - q_m(k)} P_m(k)\right)$ |

Table 4 also shows the received SNR for each subband k of transmission channel m. For the full-CSI technique, $\lambda_m(k)$ is the m-th diagonal element of $\Lambda(k)$. For the CCMI technique, $r_m(k)$ is the m-th diagonal element of $R_x(k) = H_x^H(k) \cdot H_x(k)$. For the MMSE technique, $q_m(k)$ is the m-th diagonal element of $M_{mmse}(k) \cdot H_x(k)$.

Figure 8:
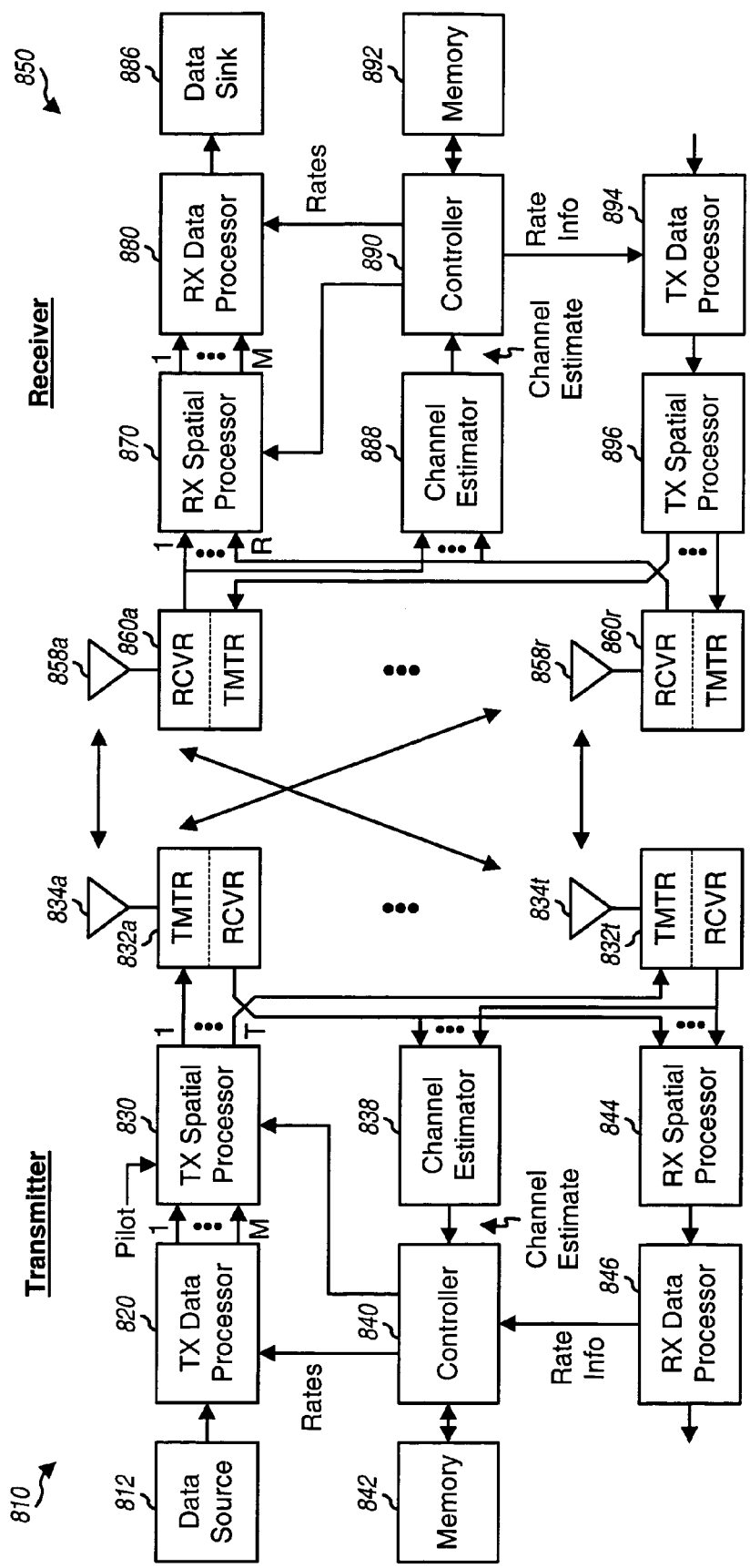
FIG. 8 shows a diagram of a transmitter and a receiver in a MIMO system.

FIG. 8 shows a block diagram of a transmitter 810 and a receiver 850 in a MIMO system. At transmitter 810, a TX data processor 820 receives traffic data from a data source 812, processes (e.g., formats, encodes, interleaves, and symbol maps) the traffic data, and provides M streams of data symbols. A TX spatial processor 830 performs spatial processing on the data symbols and pilot symbols (e.g., for eigensteering, no steering, or spatial spreading) and provides T streams of transmit symbols to T transmitter units (TMTR) 832a through 832t. Each transmitter unit 832 conditions a respective transmit symbol stream and generates a modulated signal. T modulated signals from transmitter units 832a through 832t are transmitted from T antennas 834a through 834t, respectively.

At receiver 850, R antennas 858a through 858r receive the modulated signals from transmitter 810, and each antenna provides a received signal to a respective receiver unit (RCVR) 860. Each receiver unit 860 performs processing complementary to the processing performed by transmitter units 832 and provides received symbols. An RX spatial processor 870 performs spatial matched filtering on the received symbols from all R receiver units 860 (e.g., with a spatial filter matrix derived using the full-CSI, CCMI, or MMSE technique) and provides M detected symbol streams. An RX data processor 880 processes (e.g., symbol demaps, deinterleaves, and decodes) the detected symbols and provides decoded data to a data sink 886.

Channel estimators 838 and 888 perform channel estimation for transmitter 810 and receiver 850, respectively. Controllers 840 and 890 control the operation of various processing units at transmitter 810 and receiver 850, respectively. Memory units 842 and 892 store data and program codes used by controllers 840 and 890, respectively.

For rate selection with margin sharing, channel estimator 888 estimates the response of the MIMO channel from transmitter 810 to receiver 850 and determines the received SNRs for the spatial channels of the MIMO channel. Controller 890 selects the rates for the M data streams based on the received SNRs, adjusts one or more of the rates upward with margin sharing, and provides rate information. The rate information is processed by a TX data processor 894 and a TX spatial processor 896, conditioned by transmitter units 860, and sent via antennas 858 to transmitter 810. At transmitter 810, the modulated signals from receiver 850 are received by T antennas 834, conditioned by T receiver units 832, and further processed by an RX spatial processor 844 and an RX data processor 846 to obtain the rate information from receiver 850. Controller 840 receives the rate information and provides the selected rates to TX data processor 820.

Figure 9:
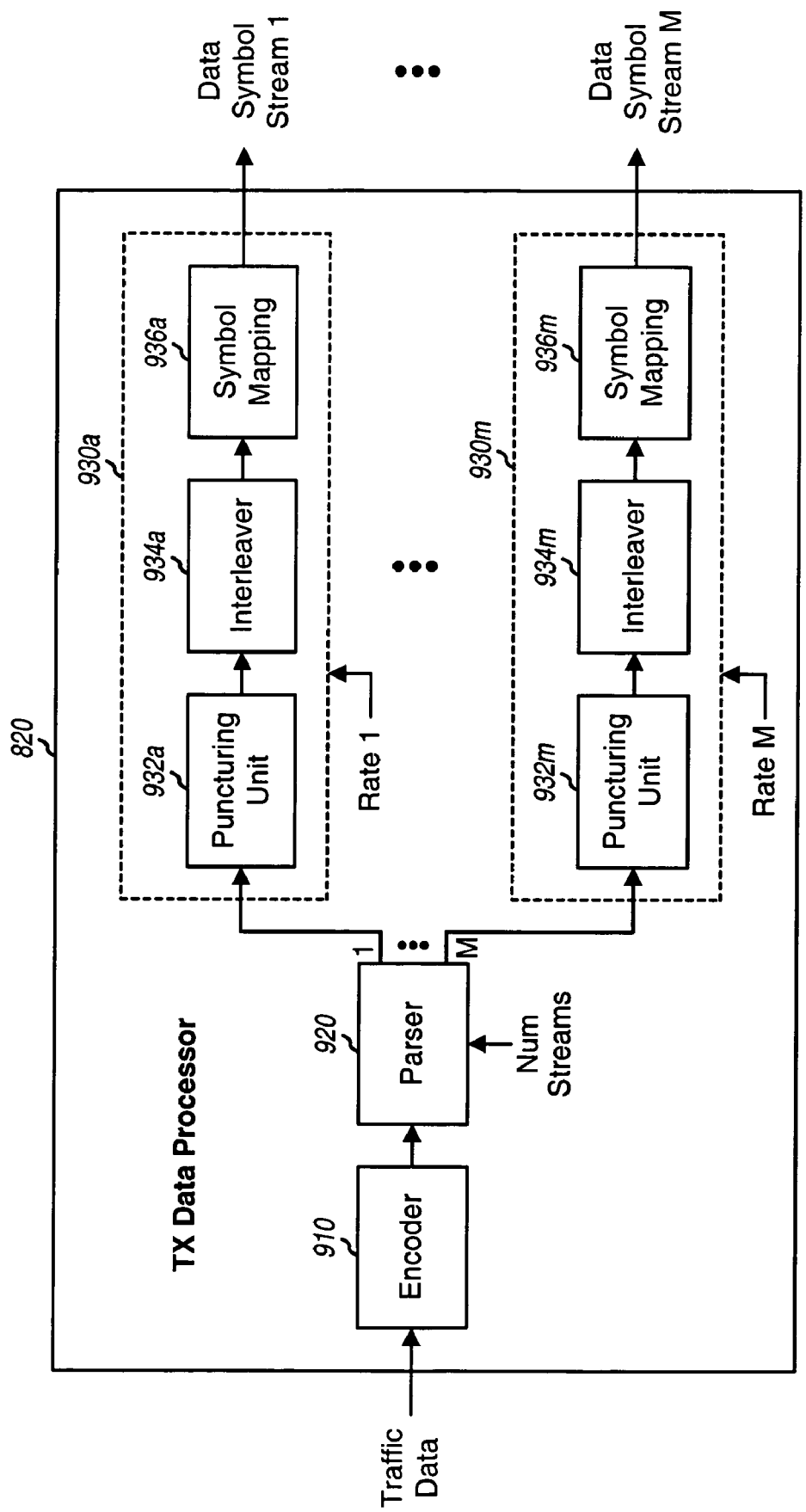
FIG. 9 shows a diagram of a transmit (TX) data processor at the transmitter.

FIG. 9 shows a block diagram of an embodiment of TX data processor 820 at transmitter 810. Within TX data processor 820, an encoder 910 encodes the traffic data in accordance with an encoding scheme and generates code bits. The encoding scheme may include a convolutional code, a Turbo code, a low density parity check (LDPC) code, a cyclic redundancy check (CRC) code, a block code, and so on, or a combination thereof. In an embodiment, encoder 910 implements a rate ½ binary convolutional encoder that generates two code bits for each data bit. A parser 920 receives the code bits from encoder 910 and parses the code bits into M streams.

M stream processors 930a through 930m receive the M streams of code bits from parser 920. Each stream processor 930 includes a puncturing unit 932, an interleaver 934, and a symbol mapping unit 936. Puncturing unit 932 punctures (or deletes) as many code bits in its stream as necessary to achieve a selected code rate for the stream. Interleaver 934 interleaves (or reorders) the code bits from puncturing unit 932 based on an interleaving scheme. Symbol mapping unit 936 maps the interleaved bits in accordance with a selected modulation scheme and provides modulation symbols. The code rate and modulation scheme for each stream are determined by the rate selected for the stream, e.g., as shown in Table 1. M stream processors 930a through 930m provide M streams of data symbols to TX spatial processor 830.

The rate selection with margin sharing techniques described herein may be implemented by various means. For example, these techniques may be implemented in hardware, software, or a combination thereof. For a hardware implementation, the processing units used to perform rate selection with margin sharing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the rate selection with margin sharing may be implemented with modules (e.g., procedures, functions, and so on) that perform the functions described herein. The software codes may be stored in a memory unit (e.g., memory units 142 and/or 192 in FIG. 1, memory units 842 and/or 892 in FIG. 8) and executed by a processor (e.g., controllers 140 and/or 190 in FIG. 1, controllers 840 and/or 890 in FIG. 8). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing rate selection for data transmission over a plurality of transmission channels in a communication system, comprising:
    obtaining a signal-to-noise ratio (SNR) estimate for each one of a plurality of data streams for transmission of the data stream over one of the transmission channels;
    selecting a rate for each data stream based on the SNR estimate for that data stream; and
    determining an SNR margin for each data stream based on the SNR estimate for that data stream and a required SNR for the rate selected for that data stream, and
    adjusting the selected rates for the data streams so that at least one data stream has its SNR margin below a threshold, each remaining data stream has its SNR margin above the threshold, and a total SNR margin for all data streams is above a total SNR margin threshold.

2. The method of claim 1, wherein adjusting the selected rates comprises
    adjusting at least one rate for the at least one data stream upward based on the SNR margins for the plurality of data streams.

3. The method of claim 2, wherein adjusting the at least one rate for the at least one data stream upward comprises
    determining the total SNR margin for the plurality of data streams based on the SNR margins for the plurality of data streams, and
    reallocating the total SNR margin to the at least one data stream to adjust the at least one rate upward.

4. The method of claim 3, wherein the reallocating the total SNR margin to the at least one data stream comprises
- selecting one data stream at a time and in a sequential order, and
- reallocating the total SNR margin to the selected data stream, if sufficient, to adjust the rate for the selected data stream upward.

5. The method of claim 4, further comprising:
ordering the plurality of data streams in the sequential order based on the SNR estimates, with a first data stream having a highest SNR estimate and a last data stream having a lowest SNR estimate.

6. The method of claim 4, further comprising:
ordering the plurality of data streams in the sequential order based on the SNR estimates, with a first data stream having a lowest SNR estimate and a last data stream having a highest SNR estimate.

7. The method of claim 4, further comprising:
ordering the plurality of data streams in the sequential order based on differential SNRs, with a first data stream having a smallest differential SNR and a last data stream having a largest differential SNR, wherein the differential SNR for each data stream corresponds to a difference between a required SNR for a next higher rate for the data stream and the SNR estimate for the data stream.

8. The method of claim 4, further comprising:
ordering the plurality of data streams in the sequential order based on promote SNRs, with a first data stream having a smallest promote SNR and a last data stream having a largest promote SNR, wherein the promote SNR for each data stream indicates an additional SNR needed to select a next higher rate for the data stream.

9. The method of claim 2, further comprising:
limiting an amount of SNR margin that can be passed from any one data stream to another data stream.

10. The method of claim 2, further comprising:
limiting an amount of SNR margin that can be reallocated to any one data stream.

11. The method of claim 1, wherein the determining the SNR estimates for the plurality of data streams comprises
- determining received SNRs for each data stream,
- determining an average SNR for each data stream based on the received SNRs for the data stream, and
- determining an SNR estimate for each data stream based on the average SNR and a back-off factor for the data stream.

12. An apparatus in a communication system including a plurality of transmission channels, comprising:
- a channel estimator operative to obtain a signal-to-noise ratio (SNR) estimates for each one of a plurality of data streams for transmission of the data stream over one of the transmission channels; and
- a controller operative to select a rate for each data streams based on the SNR estimates for that data stream, determine an SNR margin for each data stream based on the SNR estimate for that data stream and a required SNR for the rate selected for that data stream, and adjust the selected rates for the data streams so that at least one data stream has its SNR margin below a threshold, each remaining data stream has its SNR margin above the threshold, and a total SNR margin for all of the data streams is above a total SNR margin threshold.

13. The apparatus of claim 12, wherein the controller is further operative to adjust at least one rate for the at least one data stream upward-based on the SNR margins for the plurality of data streams.

14. The apparatus of claim 13, wherein the controller is operative to determine the total SNR margin for the plurality of data streams based on the SNR margins for the plurality of data streams, and to reallocate the total SNR margin to the at least one data stream to adjust the at least one rate upward.

15. The apparatus of claim 14, wherein the controller is operative to select one data stream at a time to reallocate the total SNR margin and to reallocate the total SNR margin to the selected data stream, if sufficient, to adjust the rate for the selected data stream upward.

16. An apparatus in a communication system including a plurality of transmission channels, comprising:
- means for obtaining a signal-to-noise ratio (SNR) estimates for each one of a plurality of data streams for transmission of the data stream over one of the transmission channels;
- means for selecting a rate for each of the plurality of data streams based on the SNR estimates for that data stream;
- means for determining an SNR margin for each data stream based on the SNR estimate for that data stream and a required SNR for the rate selected for that data stream, and
- means for adjusting the selected rates for the data streams so that at least one data stream has its SNR margin below a threshold, each remaining data stream has its SNR margin above the threshold, and a total SNR margin for all of the data streams is above a total SNR margin threshold.

17. The apparatus of claim 16, wherein the means for adjusting the selected rates for the plurality of data streams comprises
- means for adjusting at least one rate for at least one data stream upward based on the SNR margins for the plurality of data streams.

18. The apparatus of claim 17, wherein the means for adjusting the at least one rate for the at least one data stream upward comprises
- means for determining the total SNR margin for the plurality of data streams based on the SNR margins for the plurality of data streams, and
- means for reallocating the total SNR margin to the at least one data stream to adjust the at least one rate upward.

19. The apparatus of claim 18, wherein the means for reallocating the total SNR margin to the at least one data stream comprises
- means for selecting one data stream at a time to reallocate the total SNR margin, and
- means for reallocating the total SNR margin to the selected data stream, if sufficient, to adjust the rate for the selected data stream upward.

20. A processor readable media having stored therein processor-usable instructions for a processor, wherein said instructions when executed by the processor cause the processor to:
- obtain a signal-to-noise ratio (SNR) estimate for each one of a plurality of data streams for transmission of the data stream over one of the transmission channels;
- select a rate for each data stream based on the SNR estimate for that data stream;
- determine an SNR margin for each data stream based on the SNR estimate for that data stream and a required SNR for the rate selected for that data stream, and
- adjust the selected rates for the plurality of data streams so that at least one data stream has its SNR margin below a threshold, each remaining data stream has its SNR margins above the threshold, and a total SNR margin for all of the data streams is above a total SNR margin threshold.

21. The processor readable media of claim 20, wherein said instructions when executed by the processor farther cause the processor to:

adjust at least one rate for the at least one data stream upward based on the SNR margins for the plurality of data streams.

22. The processor readable media of claim 21, wherein said instructions when executed by the processor further cause the processor to:

determine the total SNR margin for the plurality of data streams based on the SNR margins for the plurality of data streams; and reallocate the total SNR margin to the at least one data stream to adjust the at least one rate upward.

* * * * *